US012792854B2

(12) United States Patent
Corvese et al.

(10) Patent No.: US 12,792,854 B2
(45) Date of Patent: Nov. 10, 2026

(54) LOTTERY TICKET SELLING SYSTEM HAVING A CODE READER ASSEMBLY THAT READS THE CODES PRINTED ON DRAW LOTTERY TICKETS BY A DRAW LOTTERY TICKET PRINTER

(71) Applicant: Brightstar Global Solutions Corporation, Providence, RI (US)

(72) Inventors: Robert Corvese, Warwick, RI (US); Scott Hultzman, Putnam, CT (US)

(73) Assignee: Brightstar Global Solutions Corporation, Providence, RI (US)

( * ) Notice: Subject to any disclaimer, the term of this patent is extended or adjusted under 35 U.S.C. 154(b) by 0 days.

(21) Appl. No.: 19/090,835

(22) Filed: Mar. 26, 2025

(65) Prior Publication Data

US 2026/0300659 A1 Oct. 1, 2026

(51) Int. Cl.

| | |
|---|---|
| ***G07F 17/32*** | (2006.01) |
| ***A63F 3/06*** | (2006.01) |
| ***B41J 3/30*** | (2006.01) |
| ***B41J 3/44*** | (2006.01) |
| ***B41J 3/46*** | (2006.01) |
| ***G06K 7/14*** | (2006.01) |
| *G06K 7/10* | (2006.01) |

(52) U.S. Cl.

CPC .......... *G06K 7/1413* (2013.01); *A63F 3/0655* (2013.01); *B41J 3/30* (2013.01); *B41J 3/445* (2013.01); *B41J 3/46* (2013.01); *G07F 17/329* (2013.01); *G06K 2007/10524* (2013.01)

(58) Field of Classification Search

None

See application file for complete search history.

(56) References Cited

U.S. PATENT DOCUMENTS

| | | | | |
|---|---|---|---|---|
| 10,121,139 | B2 | 11/2018 | Pitroda et al. | |
| 10,460,569 | B2 * | 10/2019 | Kennedy | G07F 17/329 |
| 10,783,744 | B2 | 9/2020 | Asher et al. | |
| 11,847,895 | B2 | 12/2023 | Gotlieb et al. | |
| 12,190,678 | B2 * | 1/2025 | Gotlieb | G07F 17/3227 |
| 2007/0093298 | A1 | 4/2007 | Brunet | |
| 2016/0119332 | A1 | 4/2016 | Pitroda et al. | |
| 2020/0023265 | A1 * | 1/2020 | Kennedy | A63F 3/0655 |
| 2022/0148371 | A1 | 5/2022 | Gotlieb et al. | |

(Continued)

OTHER PUBLICATIONS

Regulatory Review: Lottery Courier Services in the US, Vixio, downloaded from the internet at, https://www.vixio.com/blog/regulatory-overview-lottery-courier-services-in-the-us, Feb. 16, 2024.

(Continued)

*Primary Examiner* — Thien M Le
*Assistant Examiner* — April A Taylor
(74) *Attorney, Agent, or Firm* — Neal, Gerber & Eisenberg LLP

(57) ABSTRACT

A lottery ticket selling system including an electronic ticket courier server configured to communicate with an electronic player device having a courier mobile application downloaded thereon, a wager details display device, a lottery terminal with an associated scanner and configured to communicate with a lottery central system, a lottery ticket printer, and a code reader assembly configured to read codes on lottery tickets printed by the lottery ticket printer.

18 Claims, 13 Drawing Sheets

(56) References Cited

U.S. PATENT DOCUMENTS

| | | | | |
|---|---|---|---|---|
| 2024/0086882 | A1* | 3/2024 | Roeygaard | G07G 1/0045 |
| 2024/0395113 | A1 | 11/2024 | Riley et al. | |

OTHER PUBLICATIONS

What are Lottery Courier Services or Lottery Agents?, Locance, download from the internet at, https://www.google.com/url?sa=t&rct=j&q=&esrc=s&source=web&cd=&ved=2ahUKEwjc6qT_88-LAxU8lzQIHTAaJG0QFnoECBYQAQ&url=https%3A%2F%2Fwww.locance.com%2Fblog%2Fwhat-are-lottery-courier-services-or-lottery-agents%2F&usg=AOvVaw3THAO1h--uWk1tTiOJU9jg&opi=89978449, Feb. 7, 2023.

* cited by examiner

LOTTERY TICKET SELLING SYSTEM HAVING A CODE READER ASSEMBLY THAT READS THE CODES PRINTED ON DRAW LOTTERY TICKETS BY A DRAW LOTTERY TICKET PRINTER

BACKGROUND

The present disclosure relates to a lottery ticket selling system having a code reader assembly that reads the codes printed on draw lottery tickets by a lottery ticket printer.

For a draw lottery ticket for a draw lottery game, a player may select the player numbers or may have an electronic lottery system randomly select the player numbers (which is often referred to as a quick pick). Draw lottery tickets may be purchased in variety of different manners using a variety of different systems such as systems that include lottery terminals. Various different jurisdictions (such as states) have different rules regarding how such draw lottery tickets can be purchased.

BRIEF SUMMARY

In various embodiments, the present disclosure relates to a lottery ticket selling system including: a wager details display device, a ticket courier server that responsive to receiving an order for a draw lottery ticket from an electronic player device with a courier mobile application, causes a display of a wager details code associated with the draw lottery ticket by the wager details display device; a lottery terminal and associated scanner; a draw lottery ticket printer including a housing; and a code reader assembly. The code reader assembly includes a code reader and a code reader positioner that supports the code reader in a position that enables the code reader to read a code on the draw lottery ticket after the draw lottery ticket is printed by the draw lottery ticket printer and exits the housing of the draw lottery ticket printer.

In various other embodiments, the present disclosure relates to a lottery ticket selling system including: a wager details display device; a ticket courier server that responsive to receiving an order for a draw lottery ticket from an electronic player device with a courier mobile application, causes a display of a wager details code associated with the draw lottery ticket by the wager details display device; a lottery terminal and associated scanner; a draw lottery ticket printer including a housing; and a bar code reader assembly. The bar code reader assembly includes a bar code reader and a bar code reader positioner that supports the bar code reader in a position that enables the bar code reader to read a bar code on the draw lottery ticket after the draw lottery ticket is printed by the draw lottery ticket printer and rests on the housing of the draw lottery ticket printer.

In various other embodiments, the present disclosure relates to a lottery ticket selling system including: a wager details display device; a ticket courier server that responsive to receiving an order for a draw lottery ticket from an electronic player device with a courier mobile application, causes a display of a wager details code associated with the draw lottery ticket by the wager details display device; a lottery terminal and associated scanner; a draw lottery ticket printer including a housing; and a code reader assembly. The code reader assembly includes a code reader and a code reader positioner that supports the code reader in a position that enables the code reader to read a code on the draw lottery ticket after the draw lottery ticket is printed by the draw lottery ticket printer and rests on the housing of the draw lottery ticket printer. The code reader positioner includes a code reader holder, a positioning arm connected to and supporting the code reader holder, and a base connected to and supporting the positioning arm.

Additional features are described in, and will be apparent from, the following Detailed Description and the figures.

DETAILED DESCRIPTION

In various embodiments, the present disclosure relates to a lottery ticket selling system and method of operating the lottery ticket selling system, wherein the lottery ticket selling system includes a code reader assembly that reads the codes printed on draw lottery tickets by a draw lottery ticket printer of the system. The code reader assembly confirms that each ordered and purchased draw lottery ticket is printed by the draw lottery ticket printer before the system proceeds to the process of generating and printing a next ordered and purchased draw lottery ticket.

Draw lottery tickets for draw lottery games are employed as example lottery tickets herein; however, it should be appreciated that the present disclosure is not meant to be limited by such examples.

For a better understanding of the present disclosure, an example draw lottery ticket is first described herein.

A draw lottery ticket can include: (1) a single set of player numbers for a single play of a draw lottery game; (2) multiple sets of player numbers for a single play of a draw lottery game; (3) a single set of player numbers for each of multiple plays of a draw lottery game; or (4) multiple sets of player numbers for each of multiple plays of a draw lottery game. For simplicity, the present disclosure uses a draw lottery ticket with a single set of player numbers for a single play of a draw lottery game as an example, but it should be appreciated that the present disclosure can be employed for selling various other draw lottery tickets.

Figure 1:
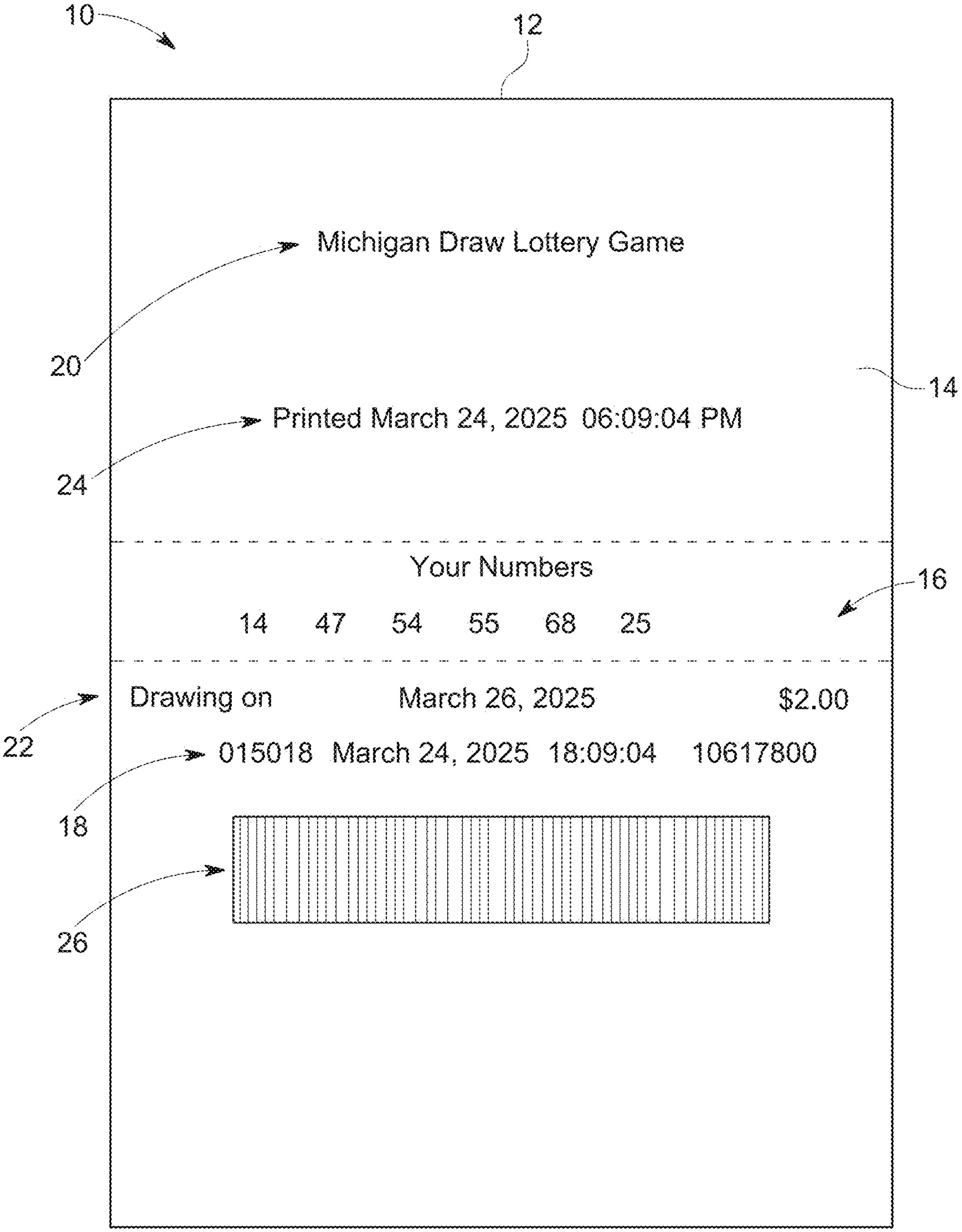
FIG. 1 is front view of an example draw lottery ticket.

An example physical draw lottery ticket 10 is shown in FIG. 1. This example draw lottery ticket includes: (1) a ticket substrate 12; (2) a front surface 14 of the ticket substrate 12; (3) draw lottery ticket information, including a single set of player numbers (for a single play of draw lottery game), printed on the front surface 14 of the ticket substrate 12; and (4) a back surface (not shown) of the ticket substrate 12. This example draw lottery ticket 10 is for a single play of a draw lottery game (scheduled to take place on Mar. 26, 2025) and includes a single set of player numbers 16 (i.e., player numbers for the single play of the draw lottery game). The draw lottery ticket information in this example includes player numbers 16, a draw lottery ticket identifier 18 that uniquely identifies the draw lottery ticket 10, a game identifier 20 that identifies the draw lottery game, a draw date 22 associated with the draw lottery ticket 10, and a print date 24 on which the draw lottery ticket 10 was printed. The draw lottery ticket information can include text, a draw lottery ticket number such as the draw lottery ticket identifier 18, a draw lottery ticket bar code such as bar code 26, and/or other draw lottery ticket information that is in either or both human readable and machine-readable forms. The draw lottery ticket's bar code 26 is configured to be scanned by a bar code reading device to enable redemption of the draw lottery ticket.

Additionally, for a better understanding of the present disclosure, an example known system and method employed for selling draw lottery tickets is also now described.

Figure 2:
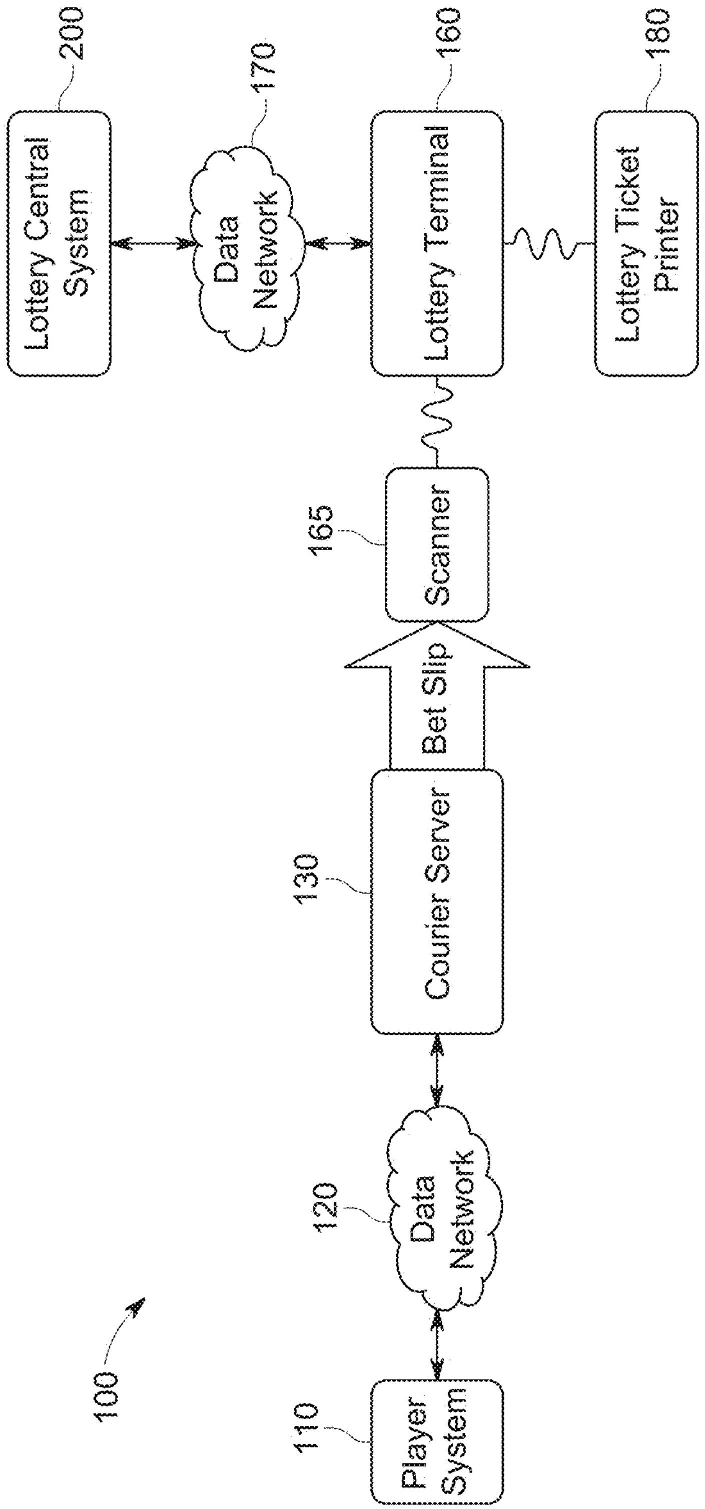
FIG. 2 is a diagrammatic view of a known lottery ticket selling system.
Figure 3:
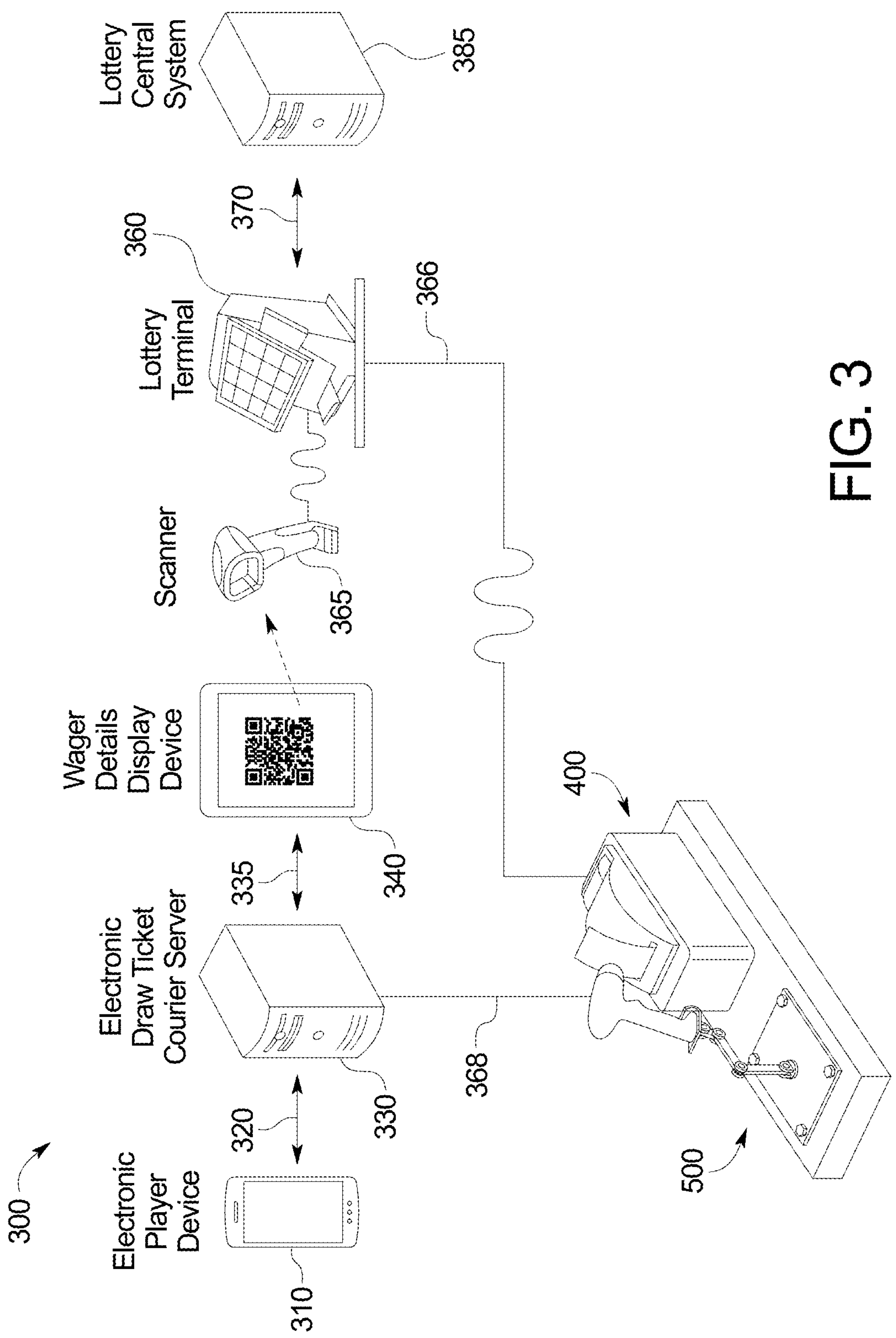
FIG. 3 is a diagrammatic perspective view of an example lottery ticket selling system having a code reader assembly that reads the codes printed on draw lottery tickets by a lottery ticket printer of the system in accordance with one example embodiment of the present disclosure.
Figure 4:
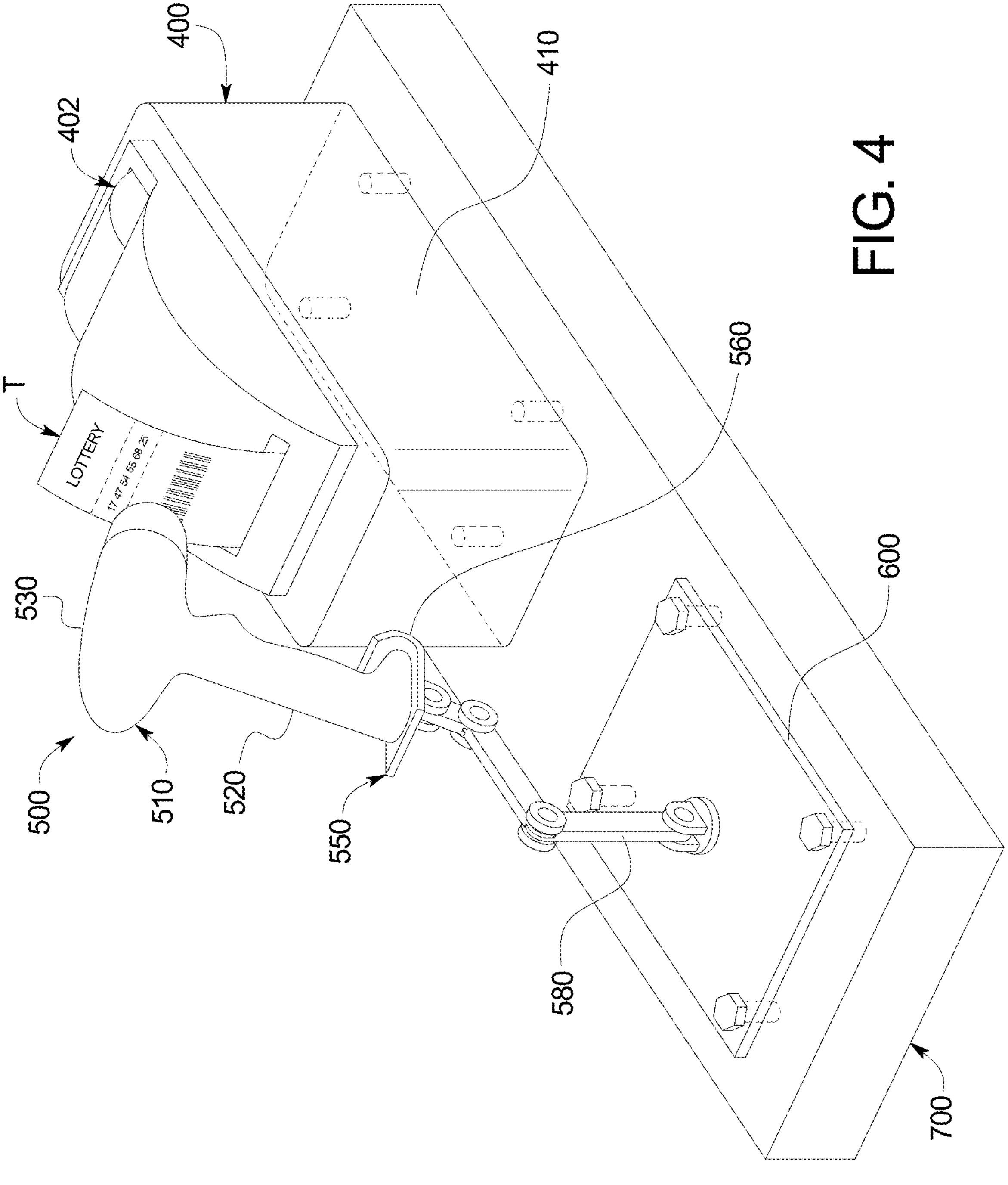
FIG. 4 is an enlarged perspective view of the lottery ticket printer and the code reader assembly of FIG. 3.
Figure 5:
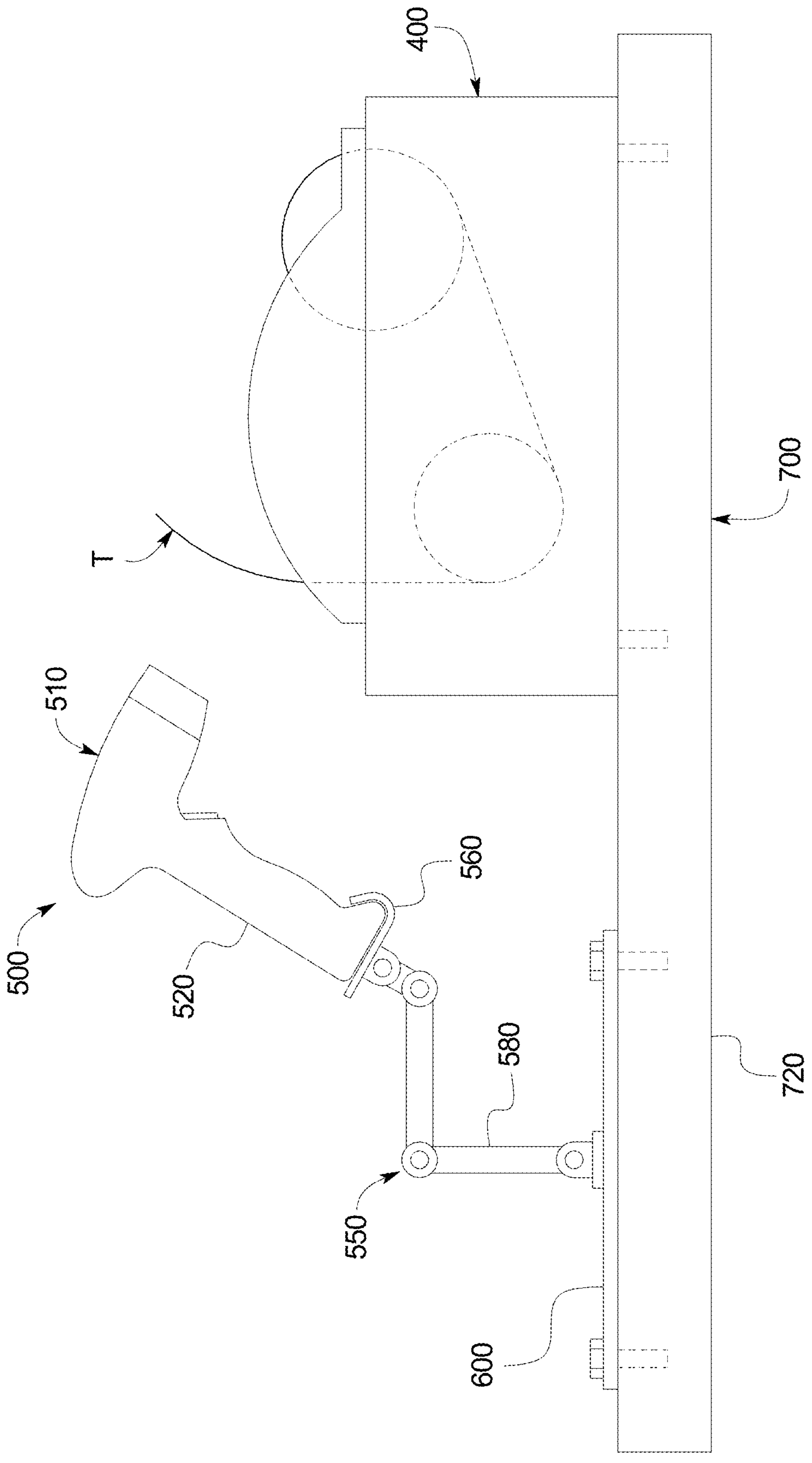
FIG. 5 is an enlarged side view of the lottery ticket printer and the code reader assembly of FIG. 3.
Figure 6:
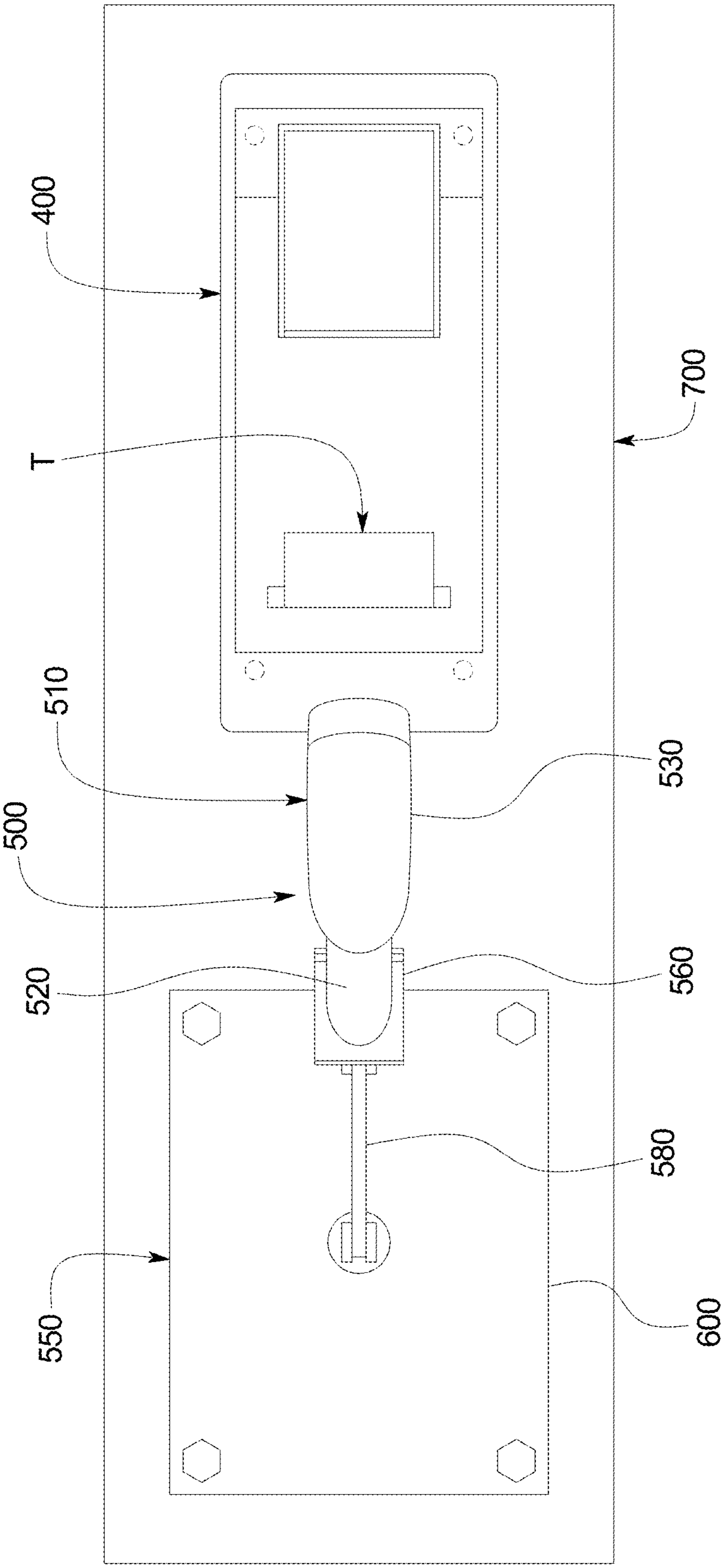
FIG. 6 is an enlarged top view of the lottery ticket printer and the code reader assembly of FIG. 3.
Figure 7:
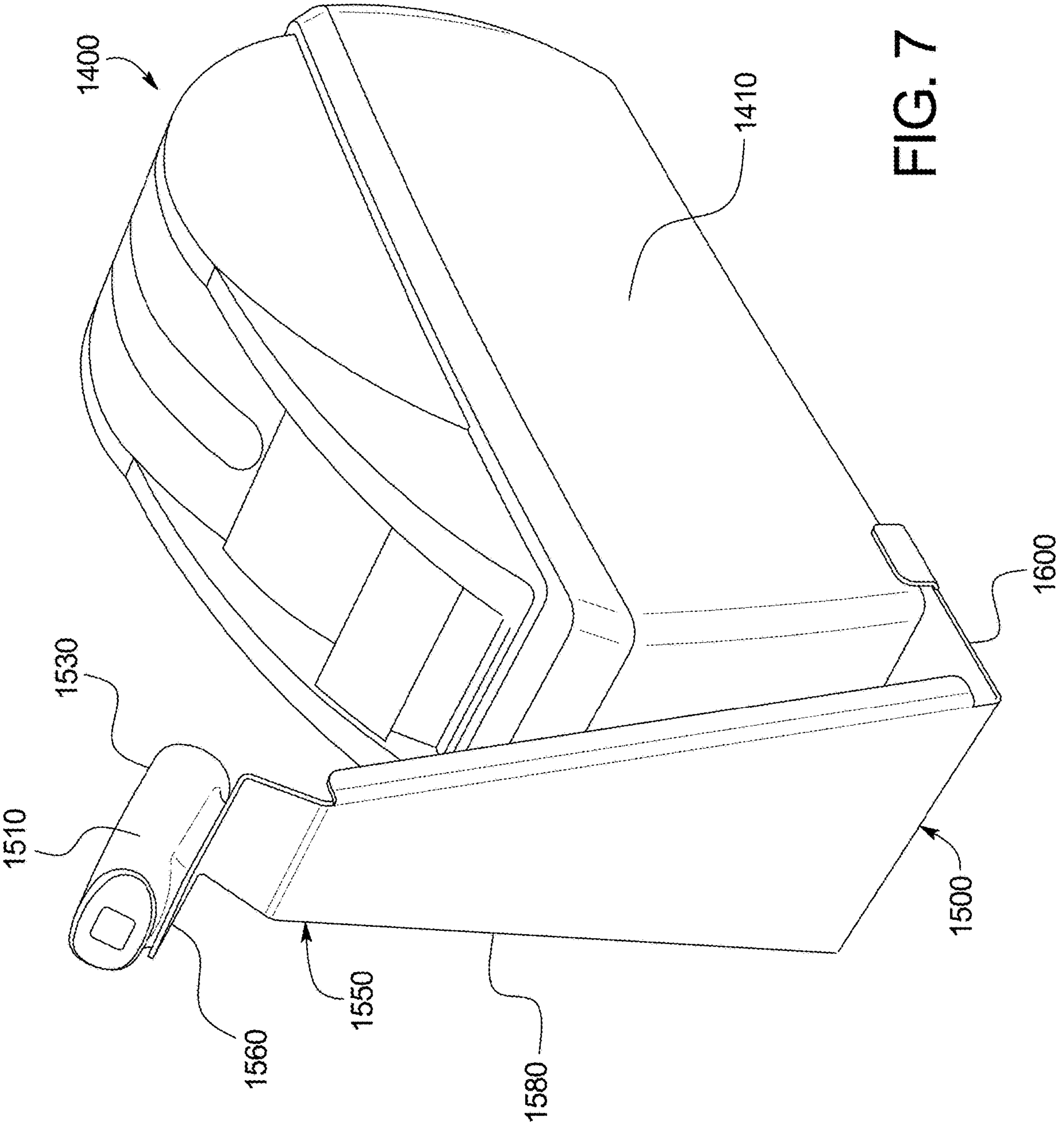
FIG. 7 is a first perspective view of a lottery ticket printer and a code reader assembly of another example embodiment of the present disclosure.
Figure 8:
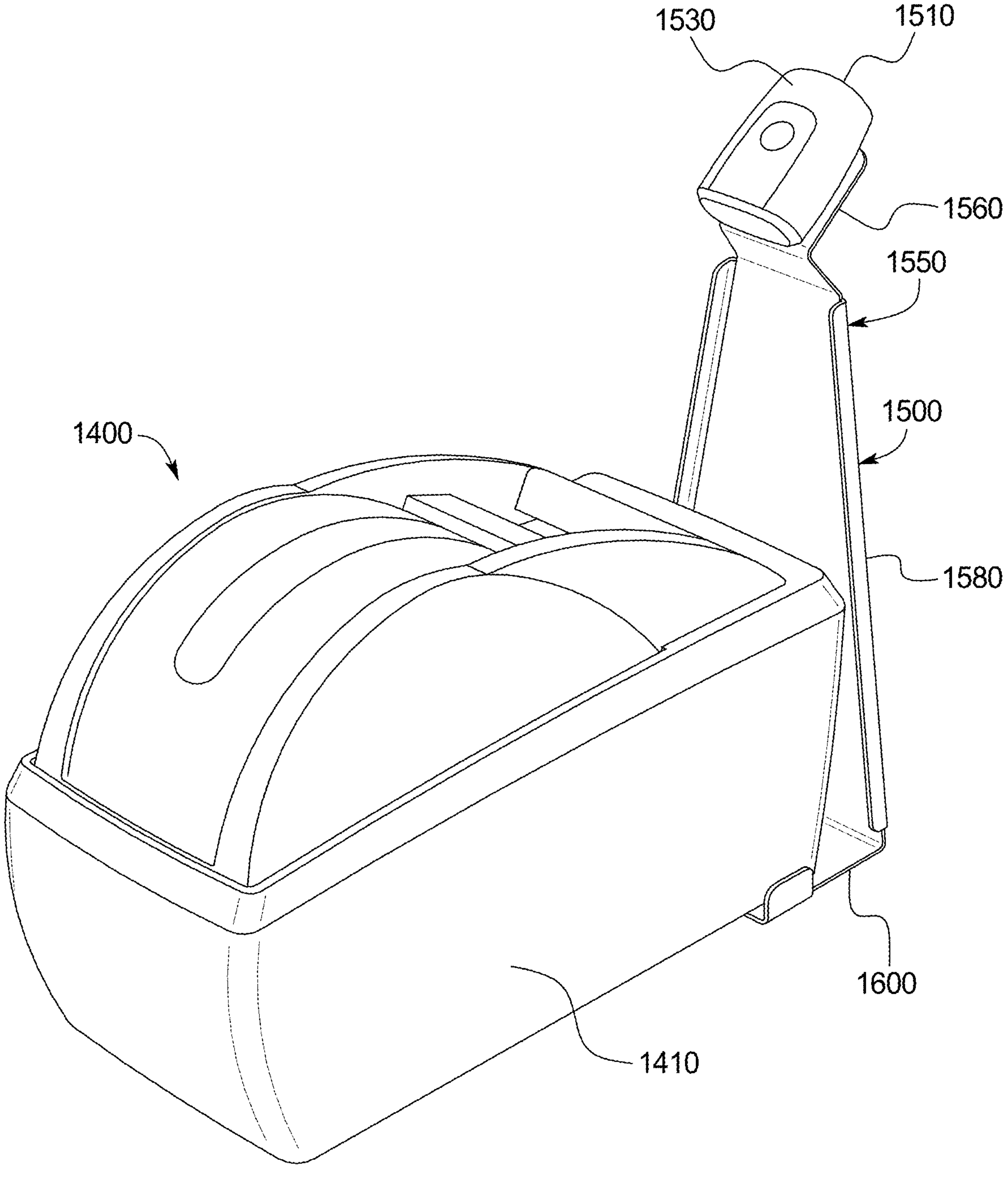
FIG. 8 is a second perspective view of the lottery ticket printer and the code reader assembly of FIG. 7.
Figure 9:
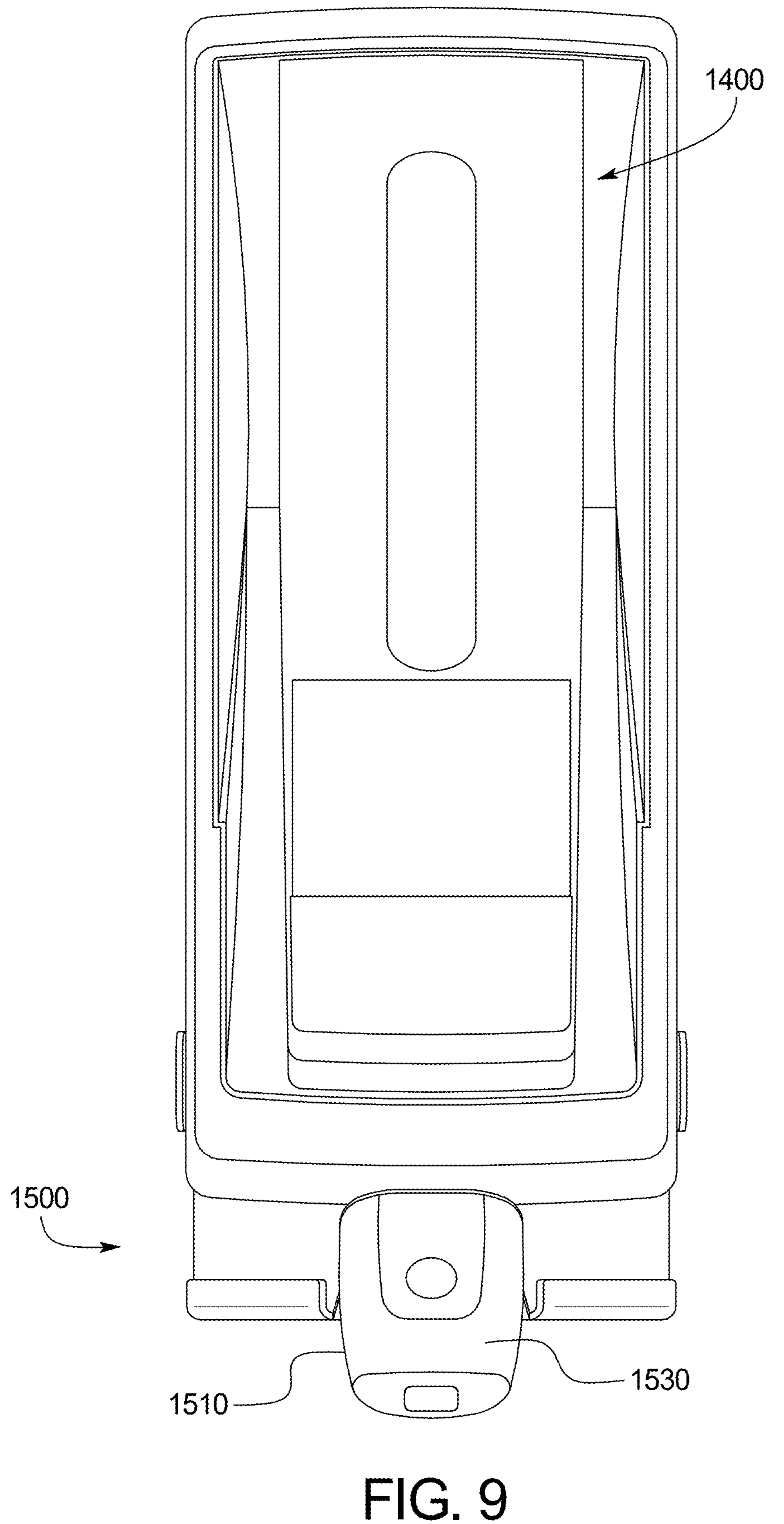
FIG. 9 is a top view of the lottery ticket printer and the code reader assembly of FIG. 7.
Figure 10:
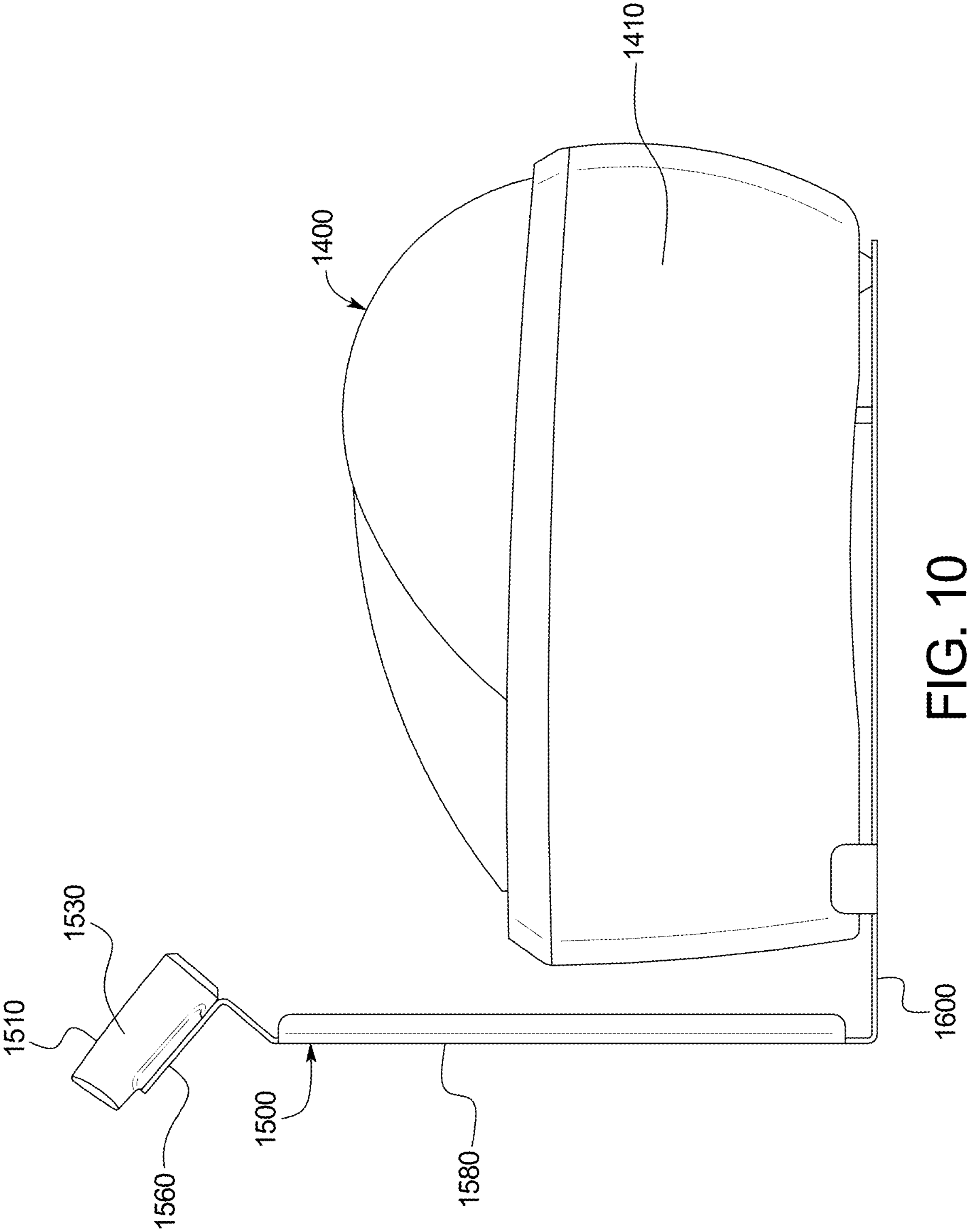
FIG. 10 is a side view of the lottery ticket printer and the code reader assembly of FIG. 7.
Figure 11:
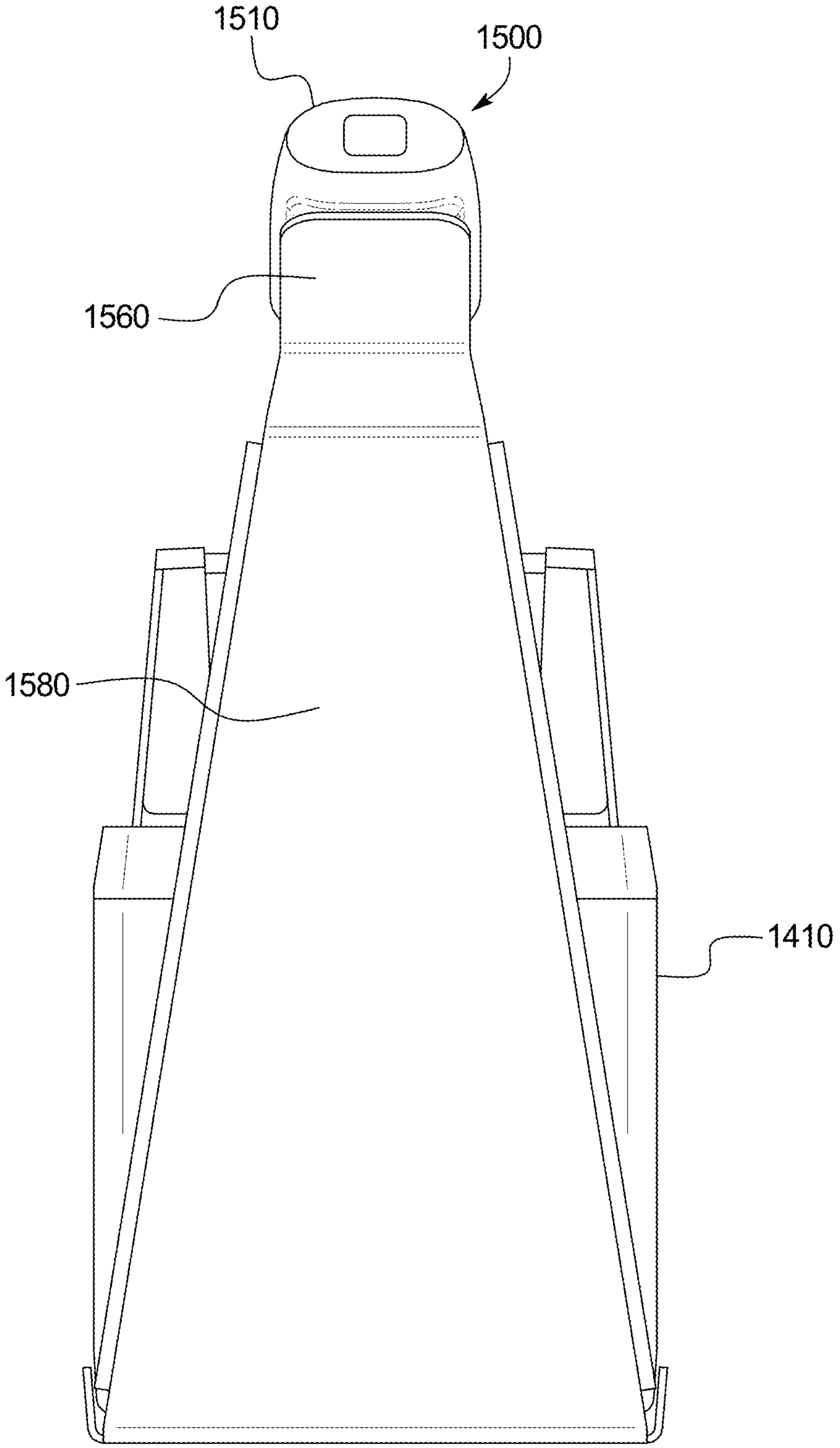
FIG. 11 is an end view of the lottery ticket printer and the code reader assembly of FIG. 7.

In various jurisdictions (such as states) that do not permit the remote electronic purchase of draw lottery tickets (such as via a website), a draw lottery ticket system 100 using a courier service has been employed. Turning to FIG. 2, the draw lottery ticket system 100 includes: (a) an electronic player system 110 with a courier mobile application downloaded thereon; (b) a courier server 130; (c) a lottery terminal 160; (d) a scanner 165 that is part of or that is associated with the lottery terminal 160; (e) a draw lottery ticket printer 180; and (f) a central lottery system 200. The electronic player system 110 and the courier server 130 are configured to communicate via a suitable data network 120. The lottery terminal 160 and the scanner 165 are configured to communicate via hard wire such as an USB connector. The lottery terminal 160 and the draw lottery ticket printer 180 are configured to communicate via hard wire such as an USB connector. The lottery terminal 160 and the lottery central system 200 are configured to communicate via a data network 170.

The electronic player system 110 includes an electronic player device such as a smartphone with the courier mobile application downloaded thereon. The courier server 130 includes a server configured to receive draw lottery game bet details from the electronic player system 110 via the courier mobile application and to generate a suitable bet slip for a play of the draw lottery game based on the draw lottery game bet details. The bet slip includes the player numbers for a selected play of a selected draw lottery game. The courier server 130 causes the bet slip to be printed such that the bet slip can be scanned by the scanner 165. A human courier processing clerk takes the physical printed paper bet slip for the play of the draw lottery game to the lottery terminal 160 to scan the physical printed paper bet slip. The scanner 165 scans the bet slip and the lottery terminal 160 uses that bet slip scan data to determine the player numbers for the play of the draw lottery game and to create the draw lottery ticket for the player. The lottery terminal 160 causes the draw lottery ticket printer 180 to print out the draw lottery ticket with the player numbers. The operator of the lottery terminal 160 also collects the payment for the draw lottery ticket from the courier processing clerk and provides the printed draw lottery ticket to the courier processing clerk. The courier processing clerk takes the physical printed bet slip and the physical printed draw lottery ticket back to the courier processing center. The courier processing clerk scans the physical printed draw lottery ticket using a courier scanning system (not shown) connected to the courier server 130. The courier server 130 links the scanned draw lottery ticket back to a player account established through the courier mobile application. The courier server 130 then makes the scanned draw lottery ticket available for the player to view via the courier mobile application on the electronic player system 110. The courier processing clerk places the physical printed bet slip and the physical printed draw lottery ticket in secure courier storage locations for storage if needed at a later time.

After the draw for the play of the draw lottery game takes place, if the player's draw lottery ticket is a winning draw lottery ticket and the winning amount is less than $600, the courier server automatically credits the winning amount for the player's draw lottery ticket to the player's account. The courier service can then retrieve and redeem the stored actual winning physical printed draw lottery ticket at a location having a lottery terminal. After the draw for the draw lottery game takes place, if the player's draw lottery ticket is a winning draw lottery ticket and the winning amount is $600 or more, a courier processing clerk retrieves the stored winning physical player draw lottery ticket from the courier storage location and provides that physical printed draw lottery ticket to the player so that the player can redeem that draw lottery ticket and obtain the winning amount.

The present disclosure is configured to be employed with various improvements to the courier system described above.

Turning now to FIGS. 3, 4, 5, and 6, an example lottery ticket selling system 300 in accordance with one example embodiment of the present disclosure is generally shown.

This illustrated example lottery ticket selling system 300 includes: (a) an electronic player device 310 with a courier mobile application downloaded thereon; (b) an electronic ticket courier server 330; (c) a wager details display device 340; (d) a lottery terminal 360 with an associated scanner 365; (e) a draw lottery ticket printer 400; (f) a lottery central system 385; and (g) a first example code reader assembly 500.

In this illustrated example embodiment, the electronic player device 310 and the courier server 330 are configured to communicate with each other via a suitable data network 320.

In this illustrated example embodiment, the courier server 330 and the wager details display device 340 can be configured to communicate with each other via a hard wire connection 335. In other embodiments, the communication between these components can be via wireless connection such as Bluetooth, or other suitable data connection such as via a suitable data network (such as but not limited to a cellular data network or the Internet).

In this illustrated example embodiment, the lottery terminal 360 and the draw lottery ticket printer 400 can be configured to communicate with each other via hard wire 366. In other embodiments, the communication between these components can be via a suitable data network.

In this illustrated example embodiment, the lottery terminal 360 and the lottery central system 385 can be configured to communicate with each other via a suitable data network 370 such as a secure data network.

In this illustrated example embodiment, the code reader assembly 500 and the courier server 330 can be configured to communicate with each other via hard wire 368. In other embodiments, the communication between these components can be via a suitable data network.

In alternative embodiments, the code reader assembly 500 and the wager details display device 340 can be configured to communicate with each other via hard wire. In other embodiments, the communication between these components can be via a suitable data network.

Generally, the lottery ticket selling system 300, for each of a plurality of draw lottery tickets: (1) enables a purchaser to employ the electronic player device 310 to order and purchase a draw lottery ticket for a play of a draw lottery game; (2) causes the electronic player device 310 to send an order including the wager details for the purchase of the draw lottery ticket to the courier server 330; (3) causes the courier server 330 to generate a wager details code (such as a QR code) based on the wager details for the ordered draw lottery ticket to be purchased; (4) causes the courier server 330 to cause the wager details display device 340 to display the code to enable scanning of the code by the scanner 365 of the lottery terminal 360 to enable the lottery terminal 360 to obtain the wager details for the ordered draw lottery ticket to be purchased; (5) causes generation of the draw lottery ticket based on the wager details; (6) generates and sends the draw lottery ticket data to the lottery central system 385; (7) causes the draw lottery ticket printer 400 to print the purchased draw lottery ticket T; (8) causes the code reader assembly 400 to read the bar code on the printed draw lottery ticket T; (9) causes the code reader assembly 400 to send bar code scan data to the courier server 330; and (10) causes the courier server 330 to associate the bar code scan data with the purchased draw lottery ticket and the purchaser and to proceed with the processing of the next purchased draw lottery ticket.

The present disclosure addresses the specific issue of ensuring that a physical draw lottery ticket is printed for each displayed wager details code and thus each draw lottery ticket ordered for purchase. The present disclosure enables confirmation that each corresponding draw lottery ticket for each wager details code displayed by the wager details display device 340 is printed by the draw lottery ticket printer 400 before the wager details display device 340 removes the display of the wager details code for that ordered draw lottery ticket and displays a wager details code for a next ordered draw lottery ticket to be printed by the draw lottery ticket printer 400. Generally, after the code reader assembly 500 reads the code (such as the bar code) from the printed draw lottery ticket (base on the wager details code for that draw lottery ticket), the code reader assembly 500 sends a signal to the courier server 330 that confirms that the draw lottery ticket was printed. The courier server 330 can then cause the display by the wager details display device 340 of the code for a next ordered draw lottery ticket being purchased via the system 300. In alternative embodiments, after the code reader assembly 500 reads the code from the printed draw lottery ticket (corresponding to a wager details code) by the draw lottery ticket printer 400, the code reader assembly 500 sends a signal to the wager details display device 340 that confirms that the draw lottery ticket was printed. The wager details display device 340 can then remove the display of the code for that printed draw lottery ticket and can then cause the display of the code for the next ordered draw lottery ticket being purchased via the system 300 that it has received from the courier server 330. These configurations enable the system 300 to process multiple draw lottery ticket purchase orders from multiple electronic player devices, que the codes for such ordered draw lottery tickets, and ensure that each draw lottery ticket is printed.

In various embodiments, the code reader assembly 500 sends a signal that includes bar code related data that enables the courier server 330 and/or the wager details display 340 to verify that the printer draw lottery ticket corresponds to the wager details for the draw lottery ticket and thus has been correctly printed.

The present disclosure also addresses the specific issue of ensuring that the code reader assembly 500 is positioned in a precise position to be able to read the code and in this example the bar code on each printed draw lottery ticket such as printed draw lottery ticket T after that draw lottery ticket is printed by and exits the housing 410 of the draw lottery ticket printer 400.

More specifically, in this example embodiment, the draw lottery ticket printer 400 includes: (a) a printer housing 410; (b) a supply paper roll holder (not shown) supported by the housing 410 and configured to receive and rotatably hold a supply paper roll 402; (c) a plurality of paper engagers (not shown) supported by the printer housing 410 and that guide and control the movement of the paper through and out of the printer 400; and (d) a controller (not shown) supported by the housing 410 and that controls the printing of the draw lottery tickets such as draw lottery ticket T. The size, shape, and configuration of the draw lottery ticket printer 400 can vary in accordance with the present disclosure. The example lottery ticket printer 400 is configured to receive draw lottery ticket print data from the lottery terminal 360 for each draw lottery ticket and process the draw lottery ticket print data via the controller to advance the supply paper from the supply paper roll 402 through a printing path and print the draw lottery tickets. The supply paper roll 402 can be any suitable roll of lottery ticket paper on which draw lottery tickets can be printed by the draw lottery ticket printer 400. In various embodiments, the supply paper roll 402 includes one or more security features, such as a watermark feature or other suitable security feature. In this example, the draw lottery ticket printer 400 also includes four spaced-apart feet (not labeled) extending downwardly from the housing 410.

The code reader assembly 500 of this example embodiment of the present disclosure is shown in FIGS. 3, 4, 5, and 6. This example is not meant to limit the present disclosure, and a further example embodiment of the code reader assembly of the present disclosure is shown in FIGS. 7, 8, 9, 10, and 11 and described below.

This illustrated example code reader assembly 500 includes a code reader 510 and a code reader positioner 550 configured to enable an operator to position the code reader 510 relative to the draw lottery ticket printer 400 and more specifically relative to each draw lottery ticket printed by the draw lottery ticket printer 400.

The code reader 510 in this example is a bar code reader and includes a handle 520, a bar code scanner housing 530 connected to the handle 520, a bar code scanner (not shown or labeled) positioned in the bar code scanner housing 530, and a transmitter (not shown or labeled) positioned in and supported by the bar code scanner housing 530. The code reader 510 is configured to scan the bar code of each draw lottery ticket such as draw lottery ticket T printed by the draw lottery ticket printer 400.

The transmitter is configured to send draw lottery ticket code data to the courier server 330 (or in alternative embodiments to the wager details display device 340). The code reader 510 can also include a controller or a processor and a memory device that stores a plurality of instructions, which when executed by the processor cause the code reader 510 to cause the transmitter to send out such draw lottery ticket code data. The transmitter includes suitable components (not shown) for wirelessly transmitting signals to the courier server 330. Alternatively, the transmitter is connected via a suitable hard wire (not shown) to the courier server 330. The transmitter can be or include any suitable type of transmitting device. In certain embodiments of the present disclosure, the transmitter is configured to only send out signals to the courier server 330. In other embodiments, the transmitter is configured to send out and receive signals to the courier server 330. In other embodiments, the transmitter is configured to send out and/or receive signals to/from the wager details display device 340.

It should be appreciated that in the alternative embodiment mentioned above where the code reader 510 sends the signals to the wager details display device 340 instead of the courier server 330, that the functions of sending, receiving, and processing the signals related to the printing of the draw lottery tickets by the draw lottery ticket printer would vary with respect to where these signals are sent and where these signals are received and acted upon. It should also be appreciated that in the alternative embodiments mentioned above where the code reader 510 sends the signals to the wager details display device 340 instead of the courier server 330, that the wager details display device 340 can include a suitable processor and memory device or another controller. In such embodiments, the wager details display device 340 will que the codes received from the courier server 330 and display each subsequent code after receiving confirmation from the lottery ticket printer 400 that indicates that the draw lottery ticket associated with the displayed code is printed.

The code reader positioner 550 includes a code reader holder 560, a positioning arm 580 connected to and supporting the code reader holder 560, a base 600 connected to and supporting the positioning arm. These components are configured to support the code reader 510 in a precise position for scanning the bar code of each draw lottery ticket such as draw lottery ticket T printed by the draw lottery ticket printer 400.

In this example embodiment, the positioning arm 1580 is flexible and includes multiple joints—and thus is configured for this dimensions and configuration of: (1) the printer 400 and specifically where the draw lottery ticket exits the housing 410 of the printer 400 and where that draw lottery ticket rests on the housing 410 until being removed by an operator; or (2) other printer dimensions and configurations.

This example embodiment of the code reader assembly 500 also includes, in addition to the base 600, a cradle 700 that supports the base 600 and the draw lottery ticket printer 400. The cradle 700 of this example embodiment of the present disclosure includes: (a) a support 720; (b) a printer holder area (not labeled); (c) a base holder area (not labeled). In this example embodiment, the base 600 and the printer 400 can be suitably attached to and/or positioned and held on the cradle 700 in any suitable manner. In this example embodiment, the longitudinal length of the support 720 of the cradle 700 is pre-set and the distance between the printer holder area and the code base holder area is a predetermined distance D to precisely position the printer 400 and the code reader assembly 500 relative to each other on the support 720. This pre-set precise distance D enables the positioning of the code reader 510 relative to the exit position of the printed draw lottery tickets. The base 600 and the cradle 700 can be alternatively configured and/or combined such as in the additional embodiment described below or in any other suitable manner.

Another example embodiment of the lottery ticket selling system 300 of the present disclosure includes an alternative draw lottery ticket printer 1400 and an alternative code reader assembly 1500 as shown in FIGS. 7, 8, 9, 10, and 11.

More specifically, in this example embodiment, the draw lottery ticket printer 1400 includes: (a) a printer housing 1410; (b) a supply paper roll holder (not shown) supported by the housing 1410 and configured to receive and rotatably hold a supply paper roll (not shown); (c) a plurality of paper engagers (not shown) supported by the printer housing 1410 and that guide and control the movement of the paper through and out of the printer 1400; and (d) a controller (not shown) supported by the housing 1410 and that controls the printing of the draw lottery tickets. The size, shape, and configuration of the draw lottery ticket printer 1400 can vary in accordance with the present disclosure. The example lottery ticket printer 1400 is configured to receive draw lottery ticket print data from the lottery terminal 360 for each draw lottery ticket and process the draw lottery ticket print data via the controller to advance the supply paper from the supply paper roll through a printing path and print the draw lottery tickets. The supply paper roll can be any suitable roll of lottery ticket paper on which draw lottery tickets can be printed by the draw lottery ticket printer. In various embodiments, the supply paper roll includes one or more security features, such as a watermark feature or other suitable security feature. In this example, the draw lottery ticket printer 1400 also includes feet (partially shown and not labeled) extending downwardly from the housing 1410.

This illustrated example code reader assembly 1500 includes a code reader 1510 and a code reader positioner 1550.

The code reader 1510 in this example embodiment is a bar code reader and includes a bar code scanner housing 1530, a bar code scanner (not shown or labeled) positioned in the bar code scanner housing 1530, and a transmitter (not shown or labeled) positioned in and supported by the bar code scanner housing 1530. The code reader 1510 is configured to scan the bar code of each draw lottery ticket printed by the draw lottery ticket printer 1400. The transmitter is configured to send, such as via a hard wire (not shown) or wirelessly) draw lottery ticket code data to the courier server 330 (or in alternative embodiments to the wager details display device 340). The code reader 1510 can also include a controller or a processor and a memory device that stores a plurality of instructions, which when executed by the processor cause the code reader 1510 to cause the transmitter to send out such draw lottery ticket code data. The transmitter includes suitable components (not shown) for wirelessly or via hard wire transmitting signals or for transmitting signal (such as further explained above).

The code reader positioner 1550 includes a code reader holder 1560, a positioning arm 1580 connected to and supporting the code reader holder 1560, and a base 1600 connected to and supporting the positioning arm 1580. These components are configured to support the code reader 1510 in a precise position for scanning the bar code of each draw lottery ticket printed by the draw lottery ticket printer 1400. It should be appreciated that the code reader positioner 1550 can include suitable components and/or one or more openings to enable secure attachment of any need hardwires to the code reader positioner 1550 and the code reader 1510.

In this example embodiment, the positioning arm 1580 is static and does not include any joint—and thus is configured for this dimensions and configuration of the printer 1400 and specifically where the draw lottery ticket exits the housing 1410 of the printer 1400 and where that draw lottery ticket rests on the housing 1410 until being removed by an operator.

In this embodiment, the base 1600 of the code reader assembly also supports the printer 1400. More specifically, the base 1600 extends under the printer housing 1410 and includes upwardly extending lips (not labeled) for engagement with and for proper positioning of the printer housing 1410.

In this example embodiment, the base 1600 enables the positioning of the code reader assembly 1500 relative to draw lottery ticket printer 1400 and relative to the exit position of the printed draw lottery tickets printed by the draw lottery ticket printer 1400.

It should be appreciated from the above that the present disclosure provides devices for confirming the printing of the draw lottery tickets by the draw lottery ticket printer without changing the draw lottery ticket printer or operation thereof.

Figure 12A:
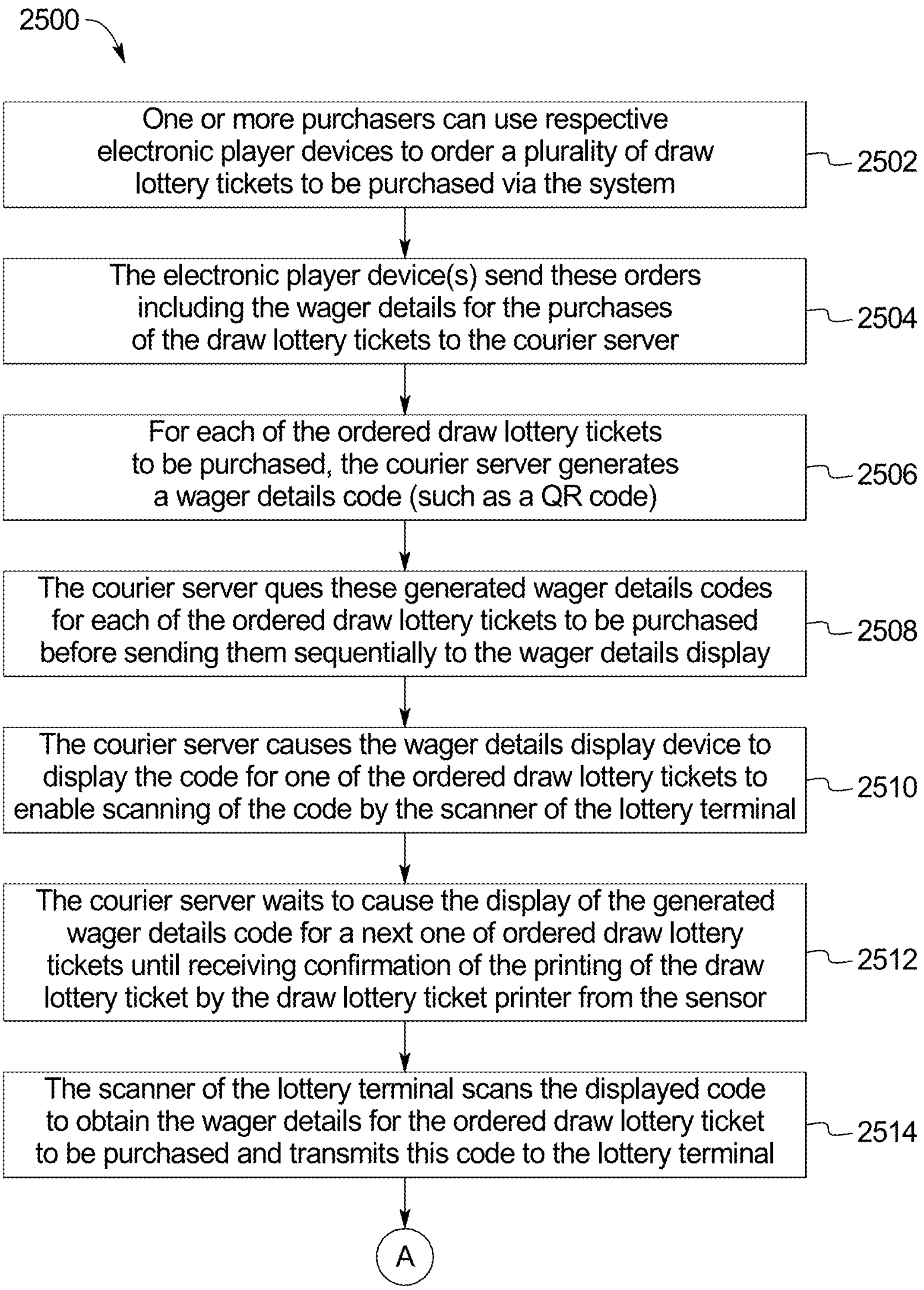
FIGS. 12A and 12B are a flow diagram showing one example method of operating the lottery ticket selling system of one example embodiment of the present disclosure.
Figure 12B:
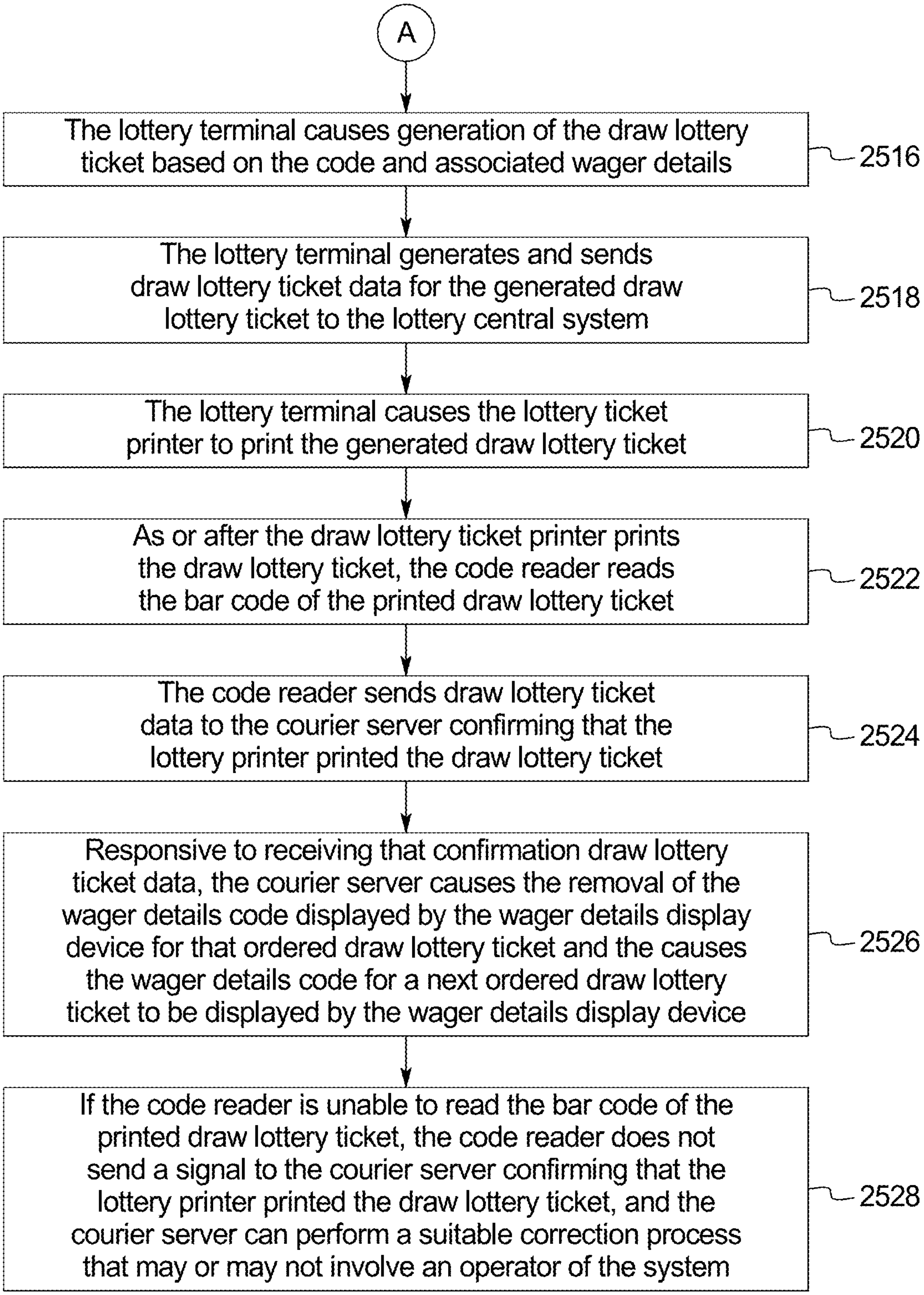

Various embodiments of present disclosure provide various methods of operating the systems of the present disclosure. FIGS. 12A and 12B are a flowchart of an example method 2500 of operating the draw lottery ticket selling system of the present disclosure (including either of the embodiments described above). In various embodiments, the method is represented by sets of instructions stored in the respective memories and executed by the respective processors. Although the method is described with reference to the flowchart shown in FIGS. 12A and 12B, many other processes of performing the acts associated with this illustrated method can be employed. For example, the order of certain of the illustrated blocks or diamonds can be changed, certain of the illustrated blocks or diamonds can be optional, or certain of the illustrated blocks or diamonds may not be employed.

One or more purchasers can use respective electronic player devices to order a plurality of draw lottery tickets to be purchased via the system, as indicated by block 2502.

The electronic player device(s) send these orders including the wager details for the purchases of the draw lottery tickets to the courier server, as indicated by block 2504.

For each of the ordered draw lottery tickets to be purchased, the courier server generates a wager details code (such as a QR code), as indicated by block 2506.

The courier server ques these generated wager details codes for each of the ordered draw lottery tickets to be purchased before sending them sequentially to the wager details display, as indicated by block 2508.

The courier server causes the wager details display device to display the code for one of the ordered draw lottery tickets to enable scanning of the code by the scanner of the lottery terminal, as indicated by block 2510.

The courier server waits to cause the display of the generated wager details code for a next one of ordered draw lottery tickets until receiving confirmation of the printing of the draw lottery ticket by the draw lottery ticket printer from the sensor, as indicated by block 2512.

The scanner of the lottery terminal scans the displayed code to obtain the wager details for the ordered draw lottery ticket to be purchased and transmits this code to the lottery terminal, as indicated by block 2514.

The lottery terminal causes generation of the draw lottery ticket based on the code and associated wager details, as indicated by block 2516.

The lottery terminal generates and sends draw lottery ticket data for the generated draw lottery ticket to the lottery central system, as indicated by block 2518.

The lottery terminal causes the lottery ticket printer to print the generated draw lottery ticket, as indicated by block 2520.

As or after the draw lottery ticket printer prints the draw lottery ticket, the code reader reads the bar code of the printed draw lottery ticket, as indicated by block 2522.

The code reader sends draw lottery ticket data to the courier server confirming that the lottery printer printed the draw lottery ticket, as indicated by block 2524.

Responsive to receiving that confirmation draw lottery ticket data, the courier server causes the removal of the wager details code displayed by the wager details display device for that ordered draw lottery ticket and the causes the wager details code for a next ordered draw lottery ticket to be displayed by the wager details display device, as indicated by block 2526.

The process indicated by blocks 2510 to 2526 sequentially repeats for each ordered draw lottery ticket and each printed draw lottery ticket.

If the code reader is unable to read the bar code of the printed draw lottery ticket, the code reader does not send a signal to the courier server confirming that the lottery printer printed the draw lottery ticket, and the courier server can perform a suitable correction process that may or may not involve an operator of the system, as indicated by block 2528. If the correction process involves an operator of the system, the courier server can cause an indication of the need for the correction process to the operator in any suitable manner.

In the embodiments where the code reader sends the signal to the wager details display device, the wager details display device controls the display of the next wager details code.

It should be appreciated that the code reader assembly of the present disclosure is shaped, sized, positionable, and otherwise configured to not interfere with the operation of the draw lottery ticket printer, the loading of paper in the draw lottery ticket printer, and/or the printing and holding of draw lottery tickets by the draw lottery ticket printer.

It should be appreciated from the above that various embodiments of the present disclosure provide lottery ticket selling system comprising: (1) a wager details display device; (2) a ticket courier server that responsive to receiving an order for a draw lottery ticket from an electronic player device with a courier mobile application, causes a display of a wager details code associated with the draw lottery ticket by the wager details display device; (3) a lottery terminal and associated scanner; (4) a draw lottery ticket printer comprising a housing; and (5) a code reader assembly comprising: (a) a code reader, and (b) a code reader positioner that supports the code reader in a position that enables the code reader to read a code on the draw lottery ticket after the draw lottery ticket is printed by the draw lottery ticket printer and exits the housing of the draw lottery ticket printer. In various such embodiments, the code reader assembly comprises a transmitter that responsive to the code reader reading the code on the draw lottery ticket, sends a signal that indicates that the draw lottery ticket printer printed the draw lottery ticket and that causes a removal of the display of the wager details code associated with that draw lottery ticket by the wager details display device. In various such embodiments, the code reader assembly comprises a transmitter that responsive to the code reader reading the code on the draw lottery ticket, sends a signal to the courier server that indicates that the draw lottery ticket printer printed the draw lottery ticket such that the courier server can causes a removal of the display of the wager details code associated with that draw lottery ticket by the wager details display device. In various such embodiments, the code reader assembly comprises a transmitter that responsive to the code reader reading the code on the draw lottery tickets, sends a signal to the wager details display device that indicates that the draw lottery ticket printer printed the draw lottery ticket such that the wager details display device can cause a removal of the display of the wager details code associated with that draw lottery ticket by the wager details display device. In various such embodiments, the code printed on the draw lottery ticket is a bar code and the code reader is a bar code reader. In various such embodiments, the code reader assembly comprises a transmitter that responsive to the bar code reader reading the bar code on the draw lottery ticket, sends draw lottery ticket code data for that draw lottery ticket to cause a removal of the display of the wager details code associated with that draw lottery ticket by the wager details display device. In various such embodiments, the code reader assembly comprises a transmitter that responsive to the bar code reader reading the bar code on the draw lottery ticket, sends draw lottery ticket code data for that draw lottery ticket to the courier server to enable the courier server to cause a removal of the display of the wager details code associated with that draw lottery ticket by the wager details display device. In various such embodiments, the code reader assembly comprises a transmitter that responsive to the bar code reader reading the bar code on the draw lottery ticket, sends draw lottery ticket code data for that draw lottery ticket to wager details display device to cause a removal of the display of the wager details code associated with that draw lottery ticket by the wager details display device. In various such embodiments, the bar code reader comprises a bar code scanner housing and a bar code scanner positioned in the bar code scanner housing, and the code reader positioner comprises a code reader holder, a positioning arm connected to and supporting the code reader holder, and a base connected to and supporting the positioning arm. In various such embodiments, the bar code reader comprises a bar code scanner housing and a bar code scanner positioned in the bar code scanner housing, and the code reader positioner comprises a code reader holder, a positioning arm connected to and supporting the code reader holder, and a base connected to and supporting the positioning arm. In various such embodiments, the base extends under the draw lottery ticket printer. In various such embodiments, the code reader positioner comprises a code reader holder, a positioning arm connected to and supporting the code reader holder, and a base connected to and supporting the positioning arm. In various such embodiments, the base extends under the draw lottery ticket printer. In various such embodiments, the base is mounted on a cradle that extends under the draw lottery ticket printer.

It should further be appreciated from the above that various embodiments of the present disclosure provide a lottery ticket selling system comprising: (1) a wager details display device; (2) a ticket courier server that responsive to receiving an order for a draw lottery ticket from an electronic player device with a courier mobile application, causes a display of a wager details code associated with the draw lottery ticket by the wager details display device; (3) a lottery terminal and associated scanner; (4) a draw lottery ticket printer comprising a housing; and (5) a bar code reader assembly comprising: (a) a bar code reader, and (b) a bar code reader positioner that supports the bar code reader in a position that enables the bar code reader to read a bar code on the draw lottery ticket after the draw lottery ticket is printed by the draw lottery ticket printer and rests on the housing of the draw lottery ticket printer. In various such embodiments, the code reader assembly comprises a transmitter that responsive to the bar code reader reading the bar code on the draw lottery ticket, sends draw lottery ticket code data for that draw lottery ticket to the courier server to enable the courier server to cause a removal of the display of the wager details code associated with that draw lottery ticket by the wager details display device. In various such embodiments, the bar code reader assembly comprises a transmitter that responsive to the bar code reader reading the bar code on the draw lottery ticket, sends draw lottery ticket code data for that draw lottery ticket to wager details display device to cause a removal of the display of the wager details code associated with that draw lottery ticket by the wager details display device.

It should be appreciated from the above that various embodiments of the present disclosure provide a lottery ticket selling system comprising: (1) a wager details display device; (2) a ticket courier server that responsive to receiving an order for a draw lottery ticket from an electronic player device with a courier mobile application, causes a display of a wager details code associated with the draw lottery ticket by the wager details display device; (3) a lottery terminal and associated scanner; (4) a draw lottery ticket printer comprising a housing; and (5) a code reader assembly comprising: (a) a code reader, and (b) a code reader positioner that supports the code reader in a position that enables the code reader to read a code on the draw lottery ticket after the draw lottery ticket is printed by the draw lottery ticket printer and rests on the housing of the draw lottery ticket printer, wherein the code reader positioner comprises a code reader holder, a positioning arm connected to and supporting the code reader holder, and a base connected to and supporting the positioning arm. In various such embodiments, the base extends under the draw lottery ticket printer. In various such embodiments, the base is mounted on a cradle that extends under the draw lottery ticket printer.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket selling system comprising:

a wager details display device;

a ticket courier server that responsive to receiving an order for a draw lottery ticket from an electronic player device with a courier mobile application, causes a display of a wager details code associated with the draw lottery ticket by the wager details display device;

a lottery terminal and associated scanner;

a draw lottery ticket printer comprising a housing; and a code reader assembly comprising:

a code reader, a code reader positioner that supports the code reader in a position that enables the code reader to read a code on the draw lottery ticket after the draw lottery ticket is printed by the draw lottery ticket printer and exits the housing of the draw lottery ticket printer, and a transmitter that responsive to the code reader reading the code on the draw lottery ticket, sends a signal that indicates that the draw lottery ticket printer printed the draw lottery ticket and that causes a removal of the display of the wager details code associated with the draw lottery ticket by the wager details display device.

2. The lottery ticket selling system of claim 1, wherein the transmitter, responsive to the code reader reading the code on the draw lottery ticket, sends the signal to the ticket courier server that indicates that the draw lottery ticket printer printed the draw lottery ticket such that the courier server causes the removal of the display of the wager details code associated with the draw lottery ticket by the wager details display device.

3. The lottery ticket selling system of claim 1, wherein the transmitter, responsive to the code reader reading the code on the draw lottery ticket, sends the signal to the wager details display device that indicates that the draw lottery ticket printer printed the draw lottery ticket such that the wager details display device causes the removal of the display of the wager details code associated with the draw lottery ticket by the wager details display device.

4. The lottery ticket selling system of claim 1, wherein the code printed on the draw lottery ticket is a bar code and the code reader is a bar code reader.

5. The lottery ticket selling system of claim 4, wherein the transmitter, responsive to the bar code reader reading the bar code on the draw lottery ticket, sends the signal that comprises draw lottery ticket code data for the draw lottery ticket to cause the removal of the display of the wager details code associated with the draw lottery ticket by the wager details display device.

6. The lottery ticket selling system of claim 4, wherein the transmitter, responsive to the bar code reader reading the bar code on the draw lottery ticket, sends the signal that comprises draw lottery ticket code data for the draw lottery ticket to the ticket courier server to enable the ticket courier server to cause the removal of the display of the wager details code associated with the draw lottery ticket by the wager details display device.

7. The lottery ticket selling system of claim 4, wherein the transmitter, responsive to the bar code reader reading the bar code on the draw lottery ticket, sends the signal that comprises draw lottery ticket code data for the draw lottery ticket to the wager details display device to cause the removal of the display of the wager details code associated with the draw lottery ticket by the wager details display device.

8. The lottery ticket selling system of claim 4, wherein the bar code reader comprises a bar code scanner housing and a bar code scanner positioned in the bar code scanner housing, and the code reader positioner comprises a code reader holder, a positioning arm connected to and supporting the code reader holder, and a base connected to and supporting the positioning arm.

9. The lottery ticket selling system of claim 4, wherein the bar code reader comprises a bar code scanner housing and a bar code scanner positioned in the bar code scanner housing, and the code reader positioner comprises a code reader holder, a positioning arm connected to and supporting the code reader holder, and a base connected to and supporting the positioning arm.

10. The lottery ticket selling system of claim 9, wherein the base extends under the draw lottery ticket printer.

11. The lottery ticket selling system of claim 1, wherein the code reader positioner comprises a code reader holder, a positioning arm connected to and supporting the code reader holder, and a base connected to and supporting the positioning arm.

12. The lottery ticket selling system of claim 11, wherein the base extends under the draw lottery ticket printer.

13. The lottery ticket selling system of claim 11, wherein the base is mounted on a cradle that extends under the draw lottery ticket printer.

14. A lottery ticket selling system comprising:

a wager details display device;

a ticket courier server that responsive to receiving an order for a draw lottery ticket from an electronic player device with a courier mobile application, causes a display of a wager details code associated with the draw lottery ticket by the wager details display device;

a lottery terminal and associated scanner;

a draw lottery ticket printer comprising a housing; and a bar code reader assembly comprising:

a bar code reader, a bar code reader positioner that supports the bar code reader in a position that enables the bar code reader to read a bar code on the draw lottery ticket after the draw lottery ticket is printed by the draw lottery ticket printer and rests on the housing of the draw lottery ticket printer, and a transmitter that responsive to the bar code reader reading the bar code on the draw lottery ticket, sends draw lottery ticket code data for the draw lottery ticket to the ticket courier server to enable the courier server to cause a removal of the display of the wager details code associated with the draw lottery ticket by the wager details display device.

15. A lottery ticket selling system comprising:

a wager details display device;

a ticket courier server that responsive to receiving an order for a draw lottery ticket from an electronic player device with a courier mobile application, causes a display of a wager details code associated with the draw lottery ticket by the wager details display device;

a lottery terminal and associated scanner;

a draw lottery ticket printer comprising a housing; and a code reader assembly comprising:

a code reader, and a code reader positioner that supports the code reader in a position that enables the code reader to read a code on the draw lottery ticket after the draw lottery ticket is printed by the draw lottery ticket printer and rests on the housing of the draw lottery ticket printer, wherein the code reader positioner comprises a code reader holder, a positioning arm connected to and supporting the code reader holder, and a base connected to and supporting the positioning arm.

16. The lottery ticket selling system of claim 15, wherein the base extends under the draw lottery ticket printer.

17. The lottery ticket selling system of claim 15, wherein the base is mounted on a cradle that extends under the draw lottery ticket printer.

18. A lottery ticket selling system comprising:

a wager details display device;

a ticket courier server that responsive to receiving an order for a draw lottery ticket from an electronic player device with a courier mobile application, causes a display of a wager details code associated with the draw lottery ticket by the wager details display device;

a lottery terminal and associated scanner;

a draw lottery ticket printer comprising a housing; and
a bar code reader assembly comprising:
a bar code reader,
a bar code reader positioner that supports the bar code reader in a position that enables the bar code reader to read a bar code on the draw lottery ticket after the draw lottery ticket is printed by the draw lottery ticket printer and rests on the housing of the draw lottery ticket printer, and
a transmitter that responsive to the bar code reader reading the bar code on the draw lottery ticket, sends the draw lottery ticket code data for the draw lottery ticket to wager details display device to cause a removal of the display of the wager details code associated with the draw lottery ticket by the wager details display device.

* * * * *